United States Patent
Li

(10) Patent No.: US 12,185,365 B2
(45) Date of Patent: Dec. 31, 2024

(54) RANDOM ACCESS METHOD AND DEVICE, AND STORAGE MEDIUM

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 546 days.

(21) Appl. No.: 17/593,825

(22) PCT Filed: Mar. 25, 2019

(86) PCT No.: PCT/CN2019/079551
§ 371 (c)(1),
(2) Date: Sep. 24, 2021

(87) PCT Pub. No.: WO2020/191586
PCT Pub. Date: Oct. 1, 2020

(65) Prior Publication Data
US 2022/0132560 A1    Apr. 28, 2022

(51) Int. Cl.
| | |
|---|---|
| *H04L 5/00* | (2006.01) |
| *H04W 52/36* | (2009.01) |
| *H04W 56/00* | (2009.01) |
| *H04W 74/00* | (2009.01) |
| *H04W 74/08* | (2024.01) |
| *H04W 74/0833* | (2024.01) |

(52) U.S. Cl.
CPC ......... *H04W 74/002* (2013.01); *H04L 5/0048* (2013.01); *H04L 5/0053* (2013.01); *H04W 52/367* (2013.01); *H04W 56/001* (2013.01); *H04W 74/0833* (2013.01)

(58) Field of Classification Search
CPC .. H04L 5/0048; H04L 5/0053; H04W 52/367; H04W 56/001; H04W 74/002; H04W 74/0833
See application file for complete search history.

(56) References Cited

U.S. PATENT DOCUMENTS

| | | | |
|---|---|---|---|
| 10,716,148 B2* | 7/2020 | Kim | H04W 74/004 |
| 10,728,823 B2* | 7/2020 | Cheng | H04W 74/008 |

(Continued)

FOREIGN PATENT DOCUMENTS

CN        107888237 A    4/2018

OTHER PUBLICATIONS

CN Notice of Allowance in application No. 201980000556.1, mailed on Oct. 23, 2023.

(Continued)

*Primary Examiner* — Alpus Hsu
(74) *Attorney, Agent, or Firm* — Syncoda LLC; Feng Ma

(57) ABSTRACT

A random access method method is implemented by a first apparatus including n antenna panels, where n is an integer greater than or equal to 2. In the method, the first device sends, by k antenna panels among the n antenna panels, at least one random access preamble individually to a second device, 1≤k≤n, and k being an integer. The first device monitors, with the k antenna panels, at least one Random Access Response (RAR) returned by the second device. The at least one RAR is returned by the second device in response to the at least one random access preamble sent by the k antenna panels.

4 Claims, 5 Drawing Sheets

(56) References Cited

U.S. PATENT DOCUMENTS

| | | | |
|---|---|---|---|
| 10,897,743 B2* | 1/2021 | Kim | H04W 72/0446 |
| 10,931,333 B2* | 2/2021 | Cao | H04B 7/0617 |
| 10,980,064 B2* | 4/2021 | Narasimha | H04L 5/0053 |
| 2018/0124837 A1 | 5/2018 | Yu et al. | |
| 2020/0137806 A1* | 4/2020 | Islam | H04B 7/0408 |
| 2021/0076445 A1* | 3/2021 | Tsai | H04L 5/003 |
| 2021/0168742 A1* | 6/2021 | Li | H04W 74/0833 |
| 2021/0212123 A1* | 7/2021 | Reial | H04W 74/0833 |

OTHER PUBLICATIONS

LG Electronics Inc. "Discussion on RACH Procedure (R1-1702442)" 3GPP TSG RAN WG1 Meeting #88 R1-1702442 Athens, Greece Feb. 13-17, 2017.

International Search Report (ISR) in PCT application No. PCT/CN2019/079551 mailed Dec. 26, 2019.

Samsung "4-step RACH procedure discussion (R1-1710636)" 3GPP TSG RAN WG1 Meeting NR AH #2 R1-1710636 Qingdao, China, Jun. 27-30, 2017.

LG Electronics "Discussion on RACH Procedure (R1-1707594)" 3GPP TSG RAN WG1 Meeting #89 R1-1707594 Hangzhou, China, May 15-19, 2017.

Partial Supplementary European Search Report in Application No. 19921916.3, mailed on Mar. 14, 2022.

3GPP TSG-RAN WG1 NR Ad-Hoc #2, Qingdao, P.R.China, Jun. 27-20, 2017, Title: Multiple Msg1 transmissions for one monitored RAR window, (R1-1710871)—XP051300073.

3GPP TSG-RAN WG1#88bis, Spokane, USA, Apr. 3-7, 2017, Nokia, Alcatel-Lucent Shanghai Bell, Title: NR Random Access Procedure (R1-1704943)—XP051243077.

* cited by examiner

RANDOM ACCESS METHOD AND DEVICE, AND STORAGE MEDIUM

CROSS-REFERENCE TO RELATED APPLICATION

This application is a U.S. national stage of International Application No. PCT/CN2019/079551 filed on Mar. 25, 2019, the disclosure of which is hereby incorporated by reference in its entirety.

TECHNICAL FIELD

Embodiments of the present disclosure generally relate to communication technologies, and more particularly, to a random access method and device and a storage medium.

BACKGROUND

With the rapid developments in communication technologies, wireless communication networks have moved towards the fifth-generation mobile communication (5G) network. In a 5G system, it is very common to initiate random access among multiple devices. For example, a terminal initiates random access to a base station.

In related arts, a device (such as a terminal) that needs to initiate random access generally initiates the random access through one transmission point (such as an antenna panel). In the 5G system, most devices have multiple antenna panels, and the multiple antenna panels can be used for random access. At present, there is no good solution as to how these devices use multiple antenna panels for random access.

SUMMARY

Embodiments of the present disclosure provide a random access method, a random access device and a storage medium. The technical solutions are as follows:

According to a first aspect of embodiments of the present disclosure, there is provided a random access method. The method is performed by a first device which includes n antenna panels, n being an integer greater than or equal to 2. The method includes:
- sending, by k antenna panels among the n antenna panels, at least one random access preamble individually to a second device, $1 \leq k \leq n$, and k being an integer; and
- monitoring, by the k antenna panels, at least one Random Access Response (RAR) returned by the second device, wherein the at least one RAR is returned by the second device in response to the at least one random access preamble sent by the k antenna panels.

According to some embodiments, when the k is greater than 1, sending, by k antenna panels among the n antenna panels, the at least one random access preamble individually to the second device includes:
- determining a first target synchronization signal block from synchronization signal blocks which are received by a first antenna panel and sent by the second device, wherein the first antenna panel is any one of the k antenna panels; and
- sending, by the first antenna panel, a random access preamble corresponding to the first target synchronization signal block to the second device on a random access resource corresponding to the first target synchronization signal block.

According to some embodiments, determining the first target synchronization signal block from synchronization signal blocks which are received by the first antenna panel and sent by the second device includes:
- obtaining signal strengths corresponding to the synchronization signal blocks which are received by the first antenna panel and sent by the second device; and
- when there is at least one synchronization signal block whose corresponding signal strength is higher than a preset strength threshold, determining one of the at least one synchronization signal block whose corresponding signal strength is higher than the preset strength threshold as the first target synchronization signal block.

According to some embodiments, monitoring, by the k antenna panels, the at least one RAR returned by the second device includes:
- in a beam direction in which the first target synchronization signal block is received, monitoring, by the first antenna panel, a RAR returned by the second device in response to the random access preamble sent by the first antenna panel.

According to some embodiments, when k is equal to 1, sending, by the k antenna panels among the n antenna panels, the at least one random access preamble individually to the second device includes:
- obtaining signal strengths corresponding to synchronization signal blocks which are received individually by the n antenna panels and sent by the second device;
- determining a synchronization signal block corresponding to a strongest signal strength as a second target synchronization signal block;
- determining an antenna panel through which the second target synchronization signal block is received as a second antenna panel; and
- sending, by the second antenna panel, a random access preamble corresponding to the second target synchronization signal block to the second device on a random access resource corresponding to the second target synchronization signal block.

According to some embodiments, sending, by the k antenna panels among the n antenna panels, the at least one random access preamble individually to the second device includes:
- a transmission power when a third antenna panel sends a random access preamble to the second device for an i-th time being greater than a transmission power when the third antenna panel sends a random access preamble to the second device for an (i−1)-th time, wherein i is an integer greater than or equal to 2;
- wherein the third antenna panel is any one of the k antenna panels, and a beam direction in which the third antenna panel sends the random access preamble to the second device for the i-th time is the same as a beam direction in which the third antenna panel sends the random access preamble to the second device for the (i−1)-th time.

According to some embodiments, sending, by the k antenna panels among the n antenna panels, the at least one random access preamble individually to the second device includes:
- a transmission power when a fourth antenna panel sends a random access preamble to the second device for an i-th time being equal to a transmission power when the fourth antenna panel sends a random access preamble to the second device for an (i−1)-th time, wherein i is an integer greater than or equal to 2;

wherein the fourth antenna panel is any one of the k antenna panels, and a beam direction in which the fourth antenna panel sends the random access preamble to the second device for the i-th time is different from a beam direction in which the fourth antenna panel sends the random access preamble to the second device for the (i−1)-th time.

According to some embodiments, there are L antenna panels which are in a transmission state at the same time among the k antenna panels, and a maximum transmission power of each of the L antenna panels is 1/L of a maximum transmission power of the first device, L is a positive integer less than or equal to k; or,
a sum of transmission powers of the L antenna panels is less than or equal to the maximum transmission power of the first device.

According to some embodiments, monitoring, by the k antenna panels, the at least one RAR returned by the second device includes:
after a first RAR returned by the second device in response to a random access preamble sent by a fifth antenna panel is successfully received for a first time by the fifth antenna panel, stopping the sending of the at least one random access preamble to the second device and the monitoring of the at least one RAR by the k antenna panels;
wherein the fifth antenna panel is an antenna panel among the k antenna panels which first successfully receives the RAR returned by the second device.

According to some embodiments, the method further includes:
sending a random access contention resolution message to the second device by at least one antenna panel among the k antenna panels.

According to some embodiments, sending the random access contention resolution message to the second device by the at least one antenna panel among the k antenna panels includes:
in a beam direction indicated by the first RAR or in a beam direction in which the fifth antenna panel sends the random access preamble, sending, by the fifth antenna panel, the random access contention resolution message corresponding to the first RAR to the second device.

According to some embodiments, sending the random access contention resolution message to the second device by the at least one antenna panel among the k antenna panels includes:
sending, by at least one other antenna panel among the k antenna panels in addition to the fifth antenna panel, a random access contention resolution message to the second device in a beam direction in which the at least one other antenna panel individually sends a random access preamble.

According to some embodiments, before sending, by k antenna panels among the n antenna panels, the at least one random access preamble individually to the second device, the method further includes:
performing, by the k antenna panels among the n antenna panels, channel detection on a bandwidth where a random access frequency domain resource is located in a listen-before-talk manner, wherein the bandwidth where the random access frequency domain resource is located is an unlicensed spectrum;
wherein sending, by k antenna panels among the n antenna panels, the at least one random access preamble individually to the second device includes:
when a channel detection result of each of the k antenna panels is an idle state, performing the step of sending the at least one random access preamble individually to the second device by k antenna panels among the n antenna panels.

According to some embodiments, before sending, by k antenna panels among the n antenna panels, the at least one random access preamble individually to the second device, the method further includes:
performing, by the k antenna panels among the n antenna panels, channel detection on a random access frequency domain resource in a listen-before-talk manner, wherein the random access frequency domain resource is a frequency domain resource shared by a plurality of first devices;
wherein sending, by k antenna panels among the n antenna panels, the at least one random access preamble individually to the second device includes:
when a channel detection result of each of the k antenna panels is an idle state, performing the step of sending the at least one random access preamble individually to the second device by k antenna panels among the n antenna panels.

According to a second aspect of embodiments of the present disclosure, there is provided a random access device. The device is applied in a first device which includes n antenna panels, n being an integer greater than or equal to 2. The device includes:
a first sending module configured to send, by k antenna panels among the n antenna panels, at least one random access preamble individually to a second device, 1≤k≤n, and k being an integer; and
a monitoring module configured to monitor, by the k antenna panels, at least one Random Access Response (RAR) returned by the second device, wherein the at least one RAR is returned by the second device in response to the at least one random access preamble sent by the k antenna panels.

According to some embodiments, the first sending module includes a first determination submodule and a first sending module:
wherein the first determination submodule is configured to, when k is greater than 1, determine a first target synchronization signal block from synchronization signal blocks which are received by a first antenna panel and sent by the second device, wherein the first antenna panel is any one of the k antenna panels; and
wherein the first sending submodule is configured to send, by the first antenna panel, a random access preamble corresponding to the first target synchronization signal block to the second device on a random access resource corresponding to the first target synchronization signal block.

According to some embodiments, the first determination submodule includes a first obtaining unit and a first determination unit:
wherein the first obtaining unit is configured to obtain signal strengths corresponding to the synchronization signal blocks which are received by the first antenna panel and sent by the second device; and
wherein the first determination unit is configured to, when there is at least one synchronization signal block whose corresponding signal strength is higher than a preset strength threshold, determine one of the at least one synchronization signal block whose corresponding signal strength is higher than the preset strength threshold as the first target synchronization signal block.

According to some embodiments, the monitoring module is configured to:

in a beam direction in which the first target synchronization signal block is received, monitor, by the first antenna panel, a RAR returned by the second device in response to the random access preamble sent by the first antenna panel.

According to some embodiments, the first sending module further includes a first obtaining submodule, a second determination submodule, a third determination submodule and a second sending submodule;

the first obtaining submodule is configured to, when k is equal to 1, obtain signal strengths corresponding to synchronization signal blocks which are received individually by the n antenna panels and sent by the second device;

the second determination submodule is configured to determine a synchronization signal block corresponding to a strongest signal strength as a second target synchronization signal block;

the third determination submodule is configured to determine an antenna panel through which the second target synchronization signal block is received as a second antenna panel; and the second sending submodule is configured to send, by the second antenna panel, a random access preamble corresponding to the second target synchronization signal block to the second device on a random access resource corresponding to the second target synchronization signal block.

According to some embodiments, the first sending module is further configured to:

a transmission power when a third antenna panel sends a random access preamble to the second device for an i-th time being greater than a transmission power when the third antenna panel sends a random access preamble to the second device for an (i−1)-th time, wherein i is an integer greater than or equal to 2;

the third antenna panel is any one of the k antenna panels, and a beam direction in which the third antenna panel sends the random access preamble to the second device for the i-th time is the same as a beam direction in which the third antenna panel sends the random access preamble to the second device for the (i−1)-th time.

According to some embodiments, the first sending module is further configured to:

a transmission power when a fourth antenna panel sends a random access preamble to the second device for an i-th time being equal to a transmission power when the fourth antenna panel sends a random access preamble to the second device for an (i−1)-th time, wherein i is an integer greater than or equal to 2;

the fourth antenna panel is any one of the k antenna panels, and a beam direction in which the fourth antenna panel sends the random access preamble to the second device for the i-th time is different from a beam direction in which the fourth antenna panel sends the random access preamble to the second device for the (i−1)-th time.

According to some embodiments, there are L antenna panels which are in a transmission state at the same time among the k antenna panels, and a maximum transmission power of each of the L antenna panels is 1/L of a maximum transmission power of the first device, L is a positive integer less than or equal to k; or, a sum of transmission powers of the L antenna panels is less than or equal to the maximum transmission power of the first device.

According to some embodiments, the monitoring module is further configured to:

after a first RAR returned by the second device in response to a random access preamble sent by a fifth antenna panel is successfully received for a first time by the fifth antenna panel, stop the sending of the at least one random access preamble to the second device and the monitoring of the at least one RAR by the k antenna panels;

wherein the fifth antenna panel is an antenna panel among the k antenna panels which first successfully receives the RAR returned by the second device.

According to some embodiments, the device further includes:

a second sending module configured to send a random access contention resolution message to the second device by at least one antenna panel among the k antenna panels.

According to some embodiments, the second sending module includes a third sending submodule:

wherein the third sending submodule is configured to, in a beam direction indicated by the first RAR or in a beam direction in which the fifth antenna panel sends the random access preamble, send, by the fifth antenna panel, the random access contention resolution message corresponding to the first RAR to the second device.

According to some embodiments, the second sending module includes a fourth sending submodule:

wherein the fourth sending submodule is configured to send, by at least one other antenna panel among the k antenna panels in addition to the fifth antenna panel, a random access contention resolution message to the second device in a beam direction in which the at least one other antenna panel individually sends a random access preamble.

According to some embodiments, the device further includes:

a first detection module configured to, before the first sending module sends, by k antenna panels among the n antenna panels, the at least one random access preamble to the second device, perform, by the k antenna panels among the n antenna panels, channel detection on a bandwidth where a random access frequency domain resource is located in a listen-before-talk manner, when the bandwidth where the random access frequency domain resource is located is an unlicensed spectrum;

the first sending module is configured to:

when a channel detection result of each of the k antenna panels is an idle state, perform the step of sending the at least one random access preamble individually to the second device by k antenna panels among the n antenna panels.

According to some embodiments, the device further includes:

a second detection module configured to, before the first sending module sends, by k antenna panels among the n antenna panels, the at least one random access preamble to the second device, perform by the k antenna panels among the n antenna panels, channel detection on a random access frequency domain resource in a listen-before-talk manner, when the random access frequency domain resource is a frequency domain resource shared by a plurality of first devices;

the first sending module is configured to:

when a channel detection result of each of the k antenna panels is an idle state, perform the step of sending the at least one random access preamble individually to the second device by k antenna panels among the n antenna panels.

According to a third aspect of embodiments of the present disclosure, there is provided a random access device. The device is applied in a first device which includes n antenna panels, n being an integer greater than or equal to 2. The device includes:

a processor;

a memory for storing instructions executable by the processor;

wherein the processor is configured to:

send, by k antenna panels among the n antenna panels, at least one random access preamble individually to a second device, 1≤k≤n, and k being an integer; and monitor, by the k antenna panels, at least one Random Access Response (RAR) returned by the second device, wherein the at least one RAR is returned by the second device in response to the at least one random access preamble sent by the k antenna panels.

According to a fourth aspect of embodiments of the present disclosure, there is provided a computer-readable storage medium having executable instructions stored thereon, wherein when a processor in a first device calls the executable instructions, the processor is caused to implement the random access method according to the first aspect or any implementation of the first aspect.

The technical solutions provided by embodiments of the present disclosure include at least the following advantageous effects:

The k antenna panels among the n antenna panels of the first device sends their respective random access preambles to the second device, 1≤k≤n, and k being an integer. The k antenna panels, each of which has sent a random access preamble, monitor their respective Random Access Responses (RARs) returned by the second device. Each of the RARs is returned by the second device in response to a random access preamble sent by a corresponding one of the k antenna panels. In a scenario where the first device has a plurality of antenna panels, the present disclosure proposes to send their respective random access preambles to the second device by the k antenna panels among the n antenna panels of the first device. In this way, the first device can initiate random access based on different antenna panels of the first device itself, and when the first device initiates random access, the chance for sending the random access preambles is increased, the efficiency of random access is improved, and the application scenario in which the first device initiates random access is extended.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

The network architecture and service scenarios described in embodiments of the present disclosure are intended to more clearly illustrate the technical solutions of embodiments of the present disclosure, and do not constitute a limitation on the technical solutions provided by the embodiments of the present disclosure. Those of ordinary skill in the art will know that with the evolution of the network architecture and the emergence of new service scenarios, the technical solutions provided in the embodiments of the present disclosure are equally applicable to similar technical problems.

Figure 1:
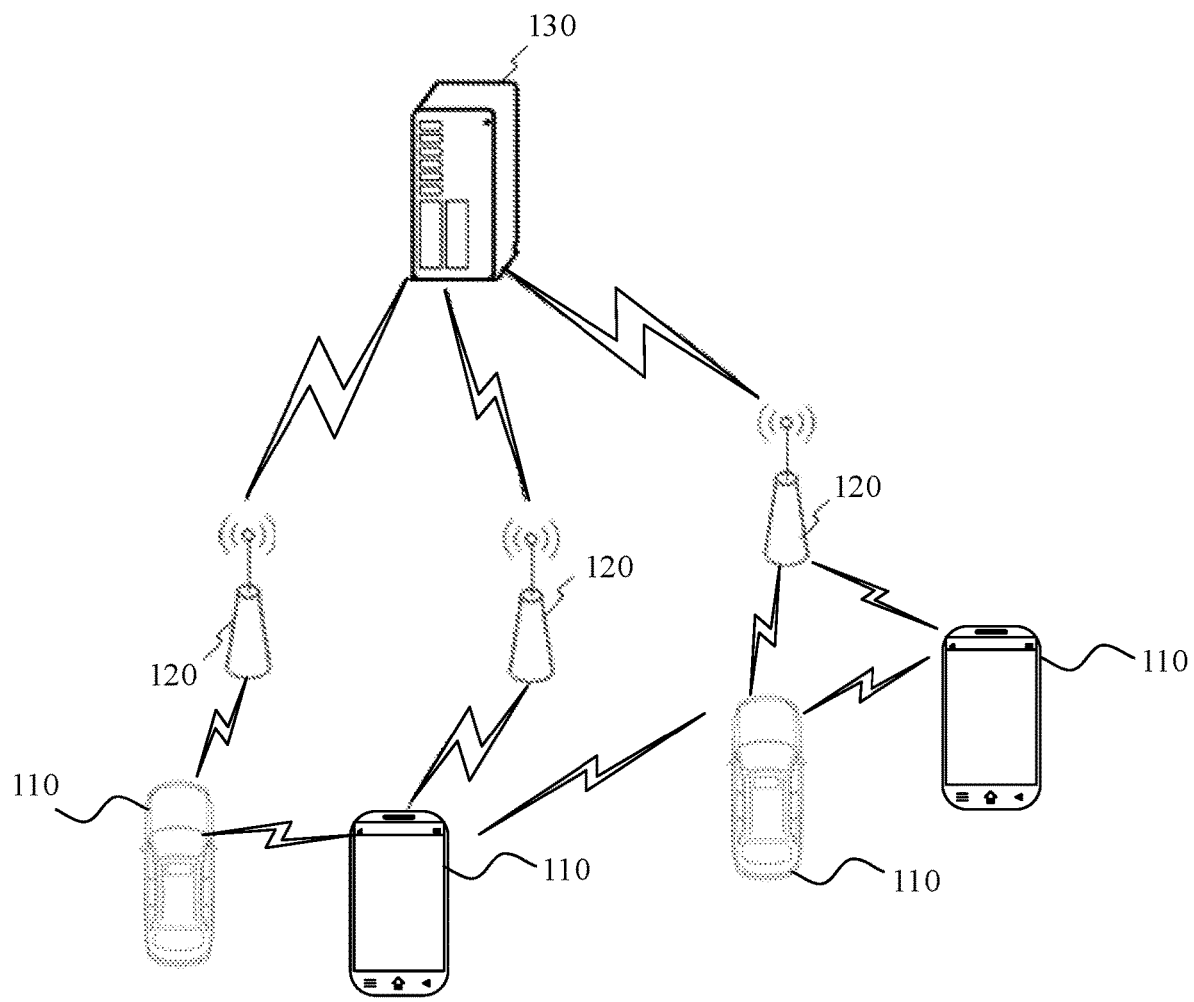
FIG. 1 is a schematic structural diagram of a wireless communication system according to an embodiment of the present disclosure.

FIG. 1 shows a schematic structural diagram of a wireless communication system according to an embodiment of the present disclosure. As shown in FIG. 1, the wireless communication system is a communication system based on the cellular mobile communication technology. The wireless communication system may include several terminals 110 and several base stations 120.

Each of the terminals 110 may be a device that provides voice and/or data connectivity to users. Each terminal 110 can communicate with one or more core networks via a Radio Access Network (RAN). Each terminal 110 can be an Internet of Things terminal, such as a sensor device, a mobile phone (or "cellular" phone), or a computer having an Internet of Things terminal, for example, the terminal 110 may be a fixed, portable, pocket-sized, or handheld device, may be built-in a computer or may be a vehicle-mounted device. For example, each terminal 110 may be a station (STA), a subscriber unit, a subscriber station, a mobile station, a mobile, a remote station, an access point, a remote terminal, an access terminal, a user terminal, a user agent, a user device, or a user equipment (UE). Alternatively, each terminal 110 may be a device of an unmanned aerial vehicle. Alternatively, each terminal 110 may be a vehicle-mounted device, for example, it may be a trip computer with a wireless communication function, or a wireless communication device connected to the trip computer. Alternatively, each terminal 110 may be a roadside device, for example, it may be a street lamp, signal lamp, or other roadside device with a wireless communication function.

Each base station 120 may be a network side device in a wireless communication system. The wireless communication system may be the 4th generation mobile communication (4G) system, also known as the Long-Term Evolution (LTE) system; or, the wireless communication system may be a 5G system, also known as a New Radio (NR) system or 5G NR system. Alternatively, the wireless communication system may be a next-generation system of the 5G system. The access network in the 5G system can be called New Generation-Radio Access Network (NG-RAN).

Each base station 120 may be an evolved base station (eNB) used in a 4G system. Alternatively, the base station 120 may be a base station (gNB) adopting a centralized and distributed architecture in the 5G system. When the base station 120 adopts the centralized and distributed architecture, it usually includes a central unit (CU) and at least two distributed units (DU). The central unit is provided with a Packet Data Convergence Protocol (PDCP) layer, a Radio Link Control (RLC) layer, and a Media Access Control (MAC) layer of a protocol stack; each distributed unit is provided with a Physical (PHY) layer of the protocol stack. Embodiments of the present disclosure do not limit the specific implementations of each base station 120.

A wireless connection can be established between a base station 120 and a terminal 110 through a wireless air interface. In different embodiments, the wireless air interface is a wireless air interface based on the fourth-generation mobile communication network technology (4G) standard; or, the wireless air interface is a wireless air interface based on the fifth-generation mobile communication network technology (5G) standard, for example, the wireless air interface is a new air interface; or, the wireless air interface may also be a wireless air interface based on a 5G-based next-generation mobile communication network technology standard.

According to some embodiments, an End to End (E2E) or Device to Device (D2D) connection may be established between the terminals 110, for example, Vehicle to Vehicle (V2V) communication, Vehicle to Infrastructure (V2I), Vehicle to Pedestrian (V2P) communication in a Vehicle to everything (V2X) communication.

According to some embodiments, the foregoing wireless communication system may further include a network management device 130.

The base stations 120 are connected to the network management device 130.

The network management device 130 may be a core network device in a wireless communication system. For example, the network management device 130 may be a Mobility Management Entity (MME) in an Evolved Packet Core (EPC). Alternatively, the network management device may be other core network devices, such as a Serving GateWay (SGW), a Public Data Network GateWay (PGW), a Policy and Charging Rules Function (PCRF) or a Home Subscriber Server (HSS), etc. The implementation form of the network management device 130 is not limited in the embodiments of the present disclosure.

In the 5G NR system, especially when the communication frequency band is in Frequency range 2 (above 6 GHz), because the high-frequency channel attenuates quickly, in order to ensure the coverage, a terminal and a base station need to use beam-based transmission and reception.

In related arts, in practical application scenarios, most base stations use one antenna panel to send data to users. When all data sent from a base station is sent by one antenna panel, the same antenna panel can only point to one beam direction at the same time, and a terminal uses a beam reversely (i.e., using a reception beam) to receive downlink data sent from the base station. The reception beam is generally indicated by a TCI state, and each TCI state corresponds to a Reference Signal (RS) identifier, also called RS index, which is used to uniquely indicate a corresponding RS. Different RSs have different RS identifiers. According to some embodiments of the present disclosure, the RS may be Non-Zero Power Channel State Information Reference Signal (NZP CSI-RS), or Synchronization Signal Block (SSB), or other reference signals, which are not limited in embodiments of the present disclosure. Table 1 shows a correspondence relationship table between TCI states and RS identifiers according to an embodiment of the present disclosure. Table 1 contains the correspondence relationship between TCI states and RS identifiers.

TABLE 1

| TCI states | RS index |
| --- | --- |
| TCI#0 | SSB index#1 |
| TCI#1 | SSB index#2 |
| TCI#2 | CSI-RS index#5 |
| TCI#3 | CSI-RS index#6 |
| . . . | . . . |

For example, when the base station informs the terminal that the TCI state is TCI #1 through DCI, the base station tells the terminal to use a reception beam when receiving the SSB index #2 to receive downlink data on PDSCH.

In the 5G NR system, base stations and terminals can use multi-antenna panels to transmit data. For multi-antenna panel scenarios, a base station can have multiple antenna panels, and the multiple antenna panels can point to different beam directions at the same time. The base station can send downlink data to a terminal through transmission beams on the multiple antenna panels, and the base station can also receive uplink data sent by the terminal through reception beams on the multiple antenna panels. The multiple antenna panels may belong to the same Transmitter Receiver Point (TRP), or may belong to multiple different TRPs. That is, a base station can have one or more TRPs, and each TRP can have one or more antenna panels, and different antenna panels can correspond to different beam directions.

Similarly, a terminal may have multiple antenna panels. The terminal can receive downlink data sent by the base station through respective beams on the multiple antenna panels, and can also send uplink data to the base station through respective beams on the multiple antenna panels. Different antenna panels can correspond to different beam directions at the same time. For a random access procedure using multiple antenna panels, there is currently no good solution.

Figure 2:
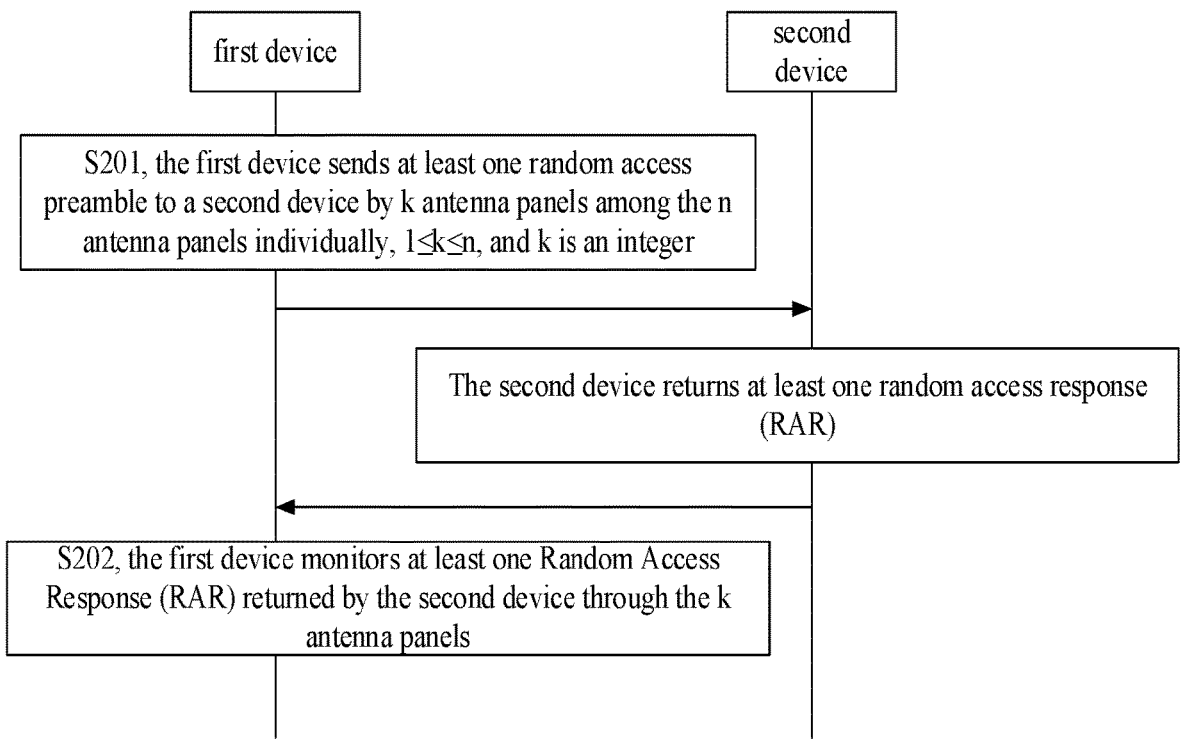
FIG. 2 is a flowchart of a random access method according to an embodiment of the present disclosure.

FIG. 2 shows a flowchart of a random access method according to an embodiment of the present disclosure. The method can be applied to a wireless communication system shown in FIG. 1. The method may be performed by a first device (terminal) in the wireless communication system, the first device includes n antenna panels, and n is an integer greater than or equal to 2. As shown in FIG. 2, the method can include the following steps:

In step 201, the first device sends at least one random access preamble to a second device by k antenna panels among the n antenna panels individually, 1≤k≤n, and k is an integer.

The second device may be a terminal in the above-mentioned wireless communication system, such as a vehicle-mounted terminal, or may be a base station in the above-mentioned wireless communication system.

In step 202, the first device monitors at least one Random Access Response (RAR) returned by the second device through the k antenna panels.

The at least one RAR is returned by the second device in response to the at least one random access preamble sent by the k antenna panels.

According to some embodiments, when the k is greater than 1, sending, by k antenna panels among the n antenna panels, the at least one random access preamble individually to the second device includes:
  determining a first target synchronization signal block from synchronization signal blocks which are received by a first antenna panel and sent by the second device, wherein the first antenna panel is any one of the k antenna panels; and
  sending, by the first antenna panel, a random access preamble corresponding to the first target synchronization signal block to the second device on a random access resource corresponding to the first target synchronization signal block.

According to some embodiments, determining the first target synchronization signal block from synchronization signal blocks which are received by the first antenna panel and sent by the second device includes:
  obtaining signal strengths corresponding to the synchronization signal blocks which are received by the first antenna panel and sent by the second device; and
  when there is at least one synchronization signal block whose corresponding signal strength is higher than a preset strength threshold, determining one of the at least one synchronization signal block whose corresponding signal strength is higher than the preset strength threshold as the first target synchronization signal block.

According to some embodiments, monitoring, by the k antenna panels, the at least one RAR returned by the second device includes:
  in a beam direction in which the first target synchronization signal block is received, monitoring, by the first antenna panel, a RAR returned by the second device in response to the random access preamble sent by the first antenna panel.

According to some embodiments, when k is equal to 1, sending, by the k antenna panels among the n antenna panels, the at least one random access preamble individually to the second device includes:
  obtaining signal strengths corresponding to synchronization signal blocks which are received individually by the n antenna panels and sent by the second device;
  determining a synchronization signal block corresponding to a strongest signal strength as a second target synchronization signal block;
  determining an antenna panel through which the second target synchronization signal block is received as a second antenna panel; and
  sending, by the second antenna panel, a random access preamble corresponding to the second target synchronization signal block to the second device on a random access resource corresponding to the second target synchronization signal block.

According to some embodiments, sending, by the k antenna panels among the n antenna panels, the at least one random access preamble individually to the second device includes:
  a transmission power when a third antenna panel sends a random access preamble to the second device for an i-th time being greater than a transmission power when the third antenna panel sends a random access preamble to the second device for an (i−1)-th time, wherein i is an integer greater than or equal to 2;
  wherein the third antenna panel is any one of the k antenna panels, and a beam direction in which the third antenna panel sends the random access preamble to the second device for the i-th time is the same as a beam direction in which the third antenna panel sends the random access preamble to the second device for the (i−1)-th time.

According to some embodiments, sending, by the k antenna panels among the n antenna panels, the at least one random access preamble individually to the second device includes:
  a transmission power when a fourth antenna panel sends a random access preamble to the second device for an i-th time being equal to a transmission power when the fourth antenna panel sends a random access preamble to the second device for an (i−1)-th time, wherein i is an integer greater than or equal to 2;
  wherein the fourth antenna panel is any one of the k antenna panels, and a beam direction in which the fourth antenna panel sends the random access preamble to the second device for the i-th time is different from a beam direction in which the fourth antenna panel sends the random access preamble to the second device for the (i−1)-th time.

According to some embodiments, there are L antenna panels which are in a transmission state at the same time among the k antenna panels, and a maximum transmission power of each of the L antenna panels is 1/L of a maximum transmission power of the first device, L is a positive integer less than or equal to k; or,
  a sum of transmission powers of the L antenna panels is less than or equal to the maximum transmission power of the first device.

According to some embodiments, monitoring, by the k antenna panels, the at least one RAR returned by the second device includes:
  after a first RAR returned by the second device in response to a random access preamble sent by a fifth antenna panel is successfully received for a first time by the fifth antenna panel, stopping the sending of the at least one random access preamble to the second device and the monitoring of the at least one RAR by the k antenna panels;
  wherein the fifth antenna panel is an antenna panel among the k antenna panels which first successfully receives the RAR returned by the second device.

According to some embodiments, the method further includes:
  sending a random access contention resolution message to the second device by at least one antenna panel among the k antenna panels.

According to some embodiments, sending the random access contention resolution message to the second device by the at least one antenna panel among the k antenna panels includes:
  in a beam direction indicated by the first RAR or in a beam direction in which the fifth antenna panel sends the random access preamble, sending, by the fifth antenna panel, the random access contention resolution message corresponding to the first RAR to the second device.

According to some embodiments, sending the random access contention resolution message to the second device by the at least one antenna panel among the k antenna panels includes:

sending, by at least one other antenna panel among the k antenna panels in addition to the fifth antenna panel, a random access contention resolution message to the second device in a beam direction in which the at least one other antenna panel individually sends a random access preamble.

According to some embodiments, before sending, by k antenna panels among the n antenna panels, the at least one random access preamble individually to the second device, the method further includes:

performing, by the k antenna panels among the n antenna panels, channel detection on a bandwidth where a random access frequency domain resource is located in a listen-before-talk manner, wherein the bandwidth where the random access frequency domain resource is located is an unlicensed spectrum;

wherein sending, by k antenna panels among the n antenna panels, the at least one random access preamble individually to the second device includes:

when a channel detection result of each of the k antenna panels is an idle state, performing the step of sending the at least one random access preamble individually to the second device by k antenna panels among the n antenna panels.

According to some embodiments, before sending, by k antenna panels among the n antenna panels, the at least one random access preamble individually to the second device, the method further includes:

performing, by the k antenna panels among the n antenna panels, channel detection on a random access frequency domain resource in a listen-before-talk manner, wherein the random access frequency domain resource is a frequency domain resource shared by a plurality of first devices;

sending, by k antenna panels among the n antenna panels, the at least one random access preamble individually to the second device includes:

when a channel detection result of each of the k antenna panels is an idle state, performing the step of sending the at least one random access preamble individually to the second device by k antenna panels among the n antenna panels.

In the present disclosure, the first device uses the k antenna panels among the n antenna panels to send their respective random access preambles to the second device. In this way, the first device can initiate random access based on different antenna panels of the first device itself, and when the first device initiates random access, the chance for sending the random access preambles is increased, the efficiency of random access is improved, and the application scenario in which the first device initiates random access is extended.

Figure 3:
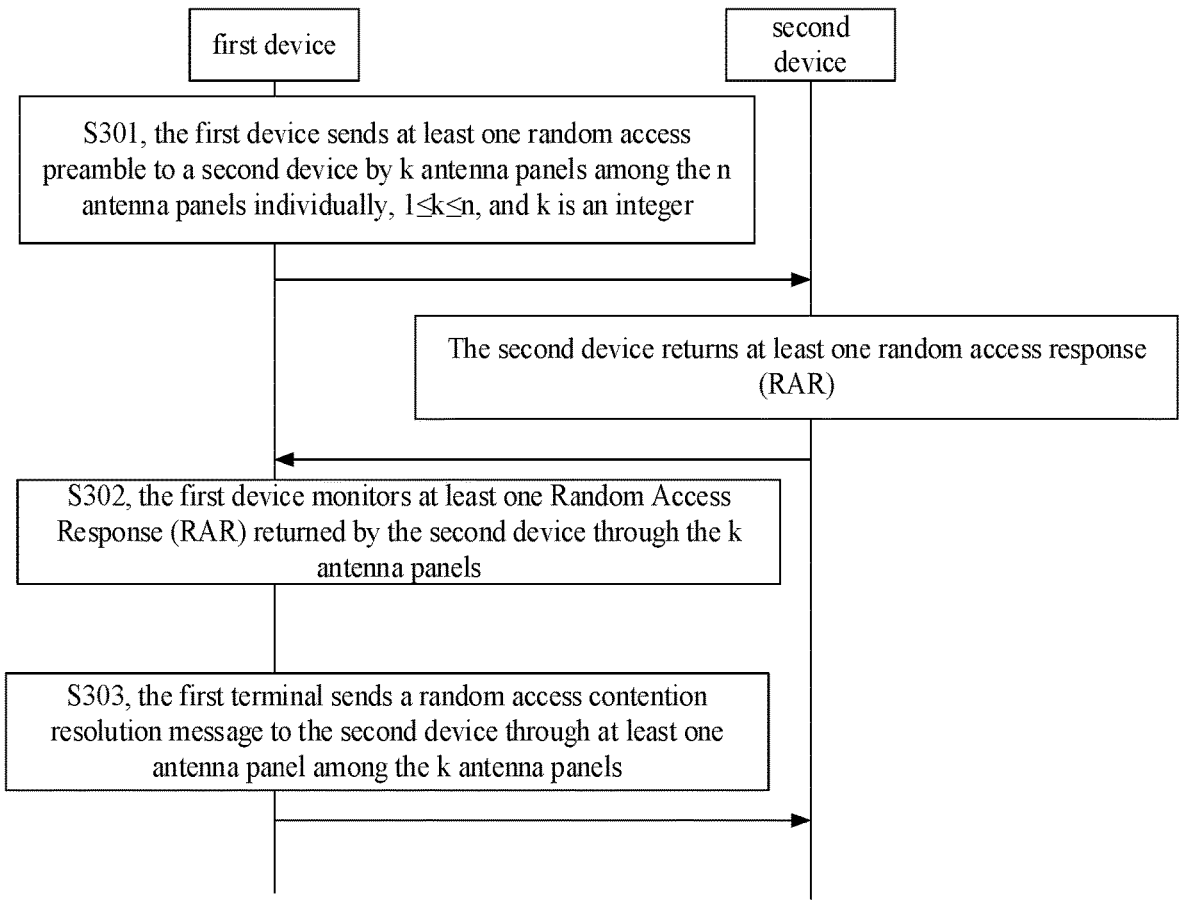
FIG. 3 is a flowchart of a random access method according to an embodiment of the present disclosure.

Before the first device initiates random access to the second device, the first device needs to synchronize with the second device. The random access method provided by embodiments of the present disclosure will be described below taking synchronization by receiving Synchronization Signal Blocks (SSBs) sent from the second device as an example. FIG. 3 shows a flowchart of a random access method according to an embodiment of the present disclosure. This method can be applied to the wireless communication system shown in FIG. 1. The method may be performed by the first device (terminal) in the wireless communication system, the first device includes n antenna panels, and n is an integer greater than or equal to 2. As shown in FIG. 3, the method can include the following steps:

In step 301, the first device sends at least one random access preamble to the second device by k antenna panels among the n antenna panels individually, $1 \leq k \leq n$, and k is an integer.

The second device may be a base station in the above-mentioned wireless communication system, or a terminal such as a vehicle-mounted terminal that can establish short-distance communication with the first device in the above-mentioned wireless communication system. According to some embodiments, for the first device with multiple antenna panels and the second device with multiple antenna panels in the above wireless communication system, the second device may send the same SSB at the same time through multiple antenna panels, or, the second device may send different SSBs at different times through multiple antenna panels. In the 5G NR system, the SSB may include indication information for Primary Synchronization Signal (PSS), Secondary Synchronization Signal (SSS), and Physical Broadcast Channel (PBCH), and so on.

Correspondingly, the first device can receive SSBs sent from the second device through its own multiple antenna panels. For any antenna panel in the first device, the antenna panel can receive multiple SSBs from the same second device (that is, the multiple SSBs contain the same PSS sequence and SSS sequence). According to some other embodiments, the first device can receive the SSBs sent from the same second device through different antenna panels, and perform combination and decoding on the SSBs from the same second device received by different antenna panels to obtain the combined SSB. After that, the first device can synchronize with the second device according to the corresponding SSB. Of course, any antenna panel in the first device can receive multiple SSBs from different second devices, and synchronize with a second device corresponding to a target SSB according to the finally determined target SSB. The present disclosure does not limit how the first device specifically receives the SSBs sent by the second device and the synchronization procedure.

Then, the first device can initiate random access to the second device which the first device has synchronized with. In a possible implementation, the first device has a total of n antenna panels, and k antenna panels among the n antenna panels are activated to receive the SSBs sent by the second device. According to some embodiments, each antenna panels in the k antenna panels may determine a target SSB according to multiple SSBs received by the antenna panel, or the k antenna panels may determine a unique target SSB from multiple SSBs received by the k antenna panels respectively.

In a possible implementation, the first device may determine a first target SSB from SSBs which are received by a first antenna panel and sent by the second device. The first antenna panel may be any one of the k antenna panels. Then, a random access preamble corresponding to the first target synchronization signal block is sent to the second device on a random access resource corresponding to the first target synchronization signal block by the first antenna panel. For example, if the first antenna panel receives three SSBs (SSB #1, SSB #2, SSB #3) sent by the second device, the first device can determine the SSB #1 among the SSBs as the first target SSB according to signal strengths of the received SSBs.

According to some embodiments, each SSB has a one-to-one correspondence with its own random access resource (including time-frequency code resources, etc.). Correspondingly, when the first device determines the first target SSB, the corresponding random access resource is also determined. For example, the time-frequency code resource corresponding to SSB #1 includes a time-frequency resource 1 and a random access preamble resource 1. When the first device determines that the first target SSB of the first antenna panel is SSB #1, the first device can determine that it is needed to send the random access preamble resource 1 corresponding to SSB #1 by first the antenna panel on the time-frequency resource 1 corresponding to SSB #1. According to some embodiments, the respective first target SSBs finally determined by the k antenna panels may be the same or different. For example, two of the k antenna panels have received SSB #4 sent by the same second device, and at this time, the respective first target SSBs determined by the two antenna panels are SSB #4. When the first device sends the random access preamble on the two antenna panels, the first device can send the random access preamble corresponding to SSB #4 on the random access time-frequency resource corresponding to SSB #4.

In a possible implementation, for example, the k antenna panels may determine a corresponding first target SSBs according to signal strengths of the received SSBs. That is, the first antenna panel can obtain signal strengths corresponding to SSBs which are received by the first antenna panel and sent from the second device, and determine one SSB having a signal strength higher than a preset strength threshold as the first target SSB. When the k antenna panels of the first device receive SSBs, each antenna panel can record the SSB identifier of each received SSB and the Reference Signal Received Power (RSRP) value of each received SSB, and determines one of the SSBs which has a RSRP value higher than a preset strength threshold as the first target SSB.

According to some embodiments, when there is at least one synchronization signal block whose corresponding channel strength is higher than a preset strength threshold in the RSRP values of SSBs recorded by the first antenna panel, the first antenna panel determines one of the at least one synchronization signal block whose corresponding channel strength is higher than the preset strength threshold as the first target synchronization signal block.

In a possible implementation, when there are a plurality of SSBs whose RSRP values are higher than the preset strength threshold in the RSRP values of SSBs recorded by the first antenna panel, the first device can randomly select one of the plurality of SSBs as the first target SSB of the first antenna panel under such condition. Alternatively, the plurality of SSBs whose RSRP values are higher than the preset strength threshold may be ranked, and one SSB with the highest RSRP value among the SSBs may be selected as the first target SSB of the first antenna panel. For example, if the RSRP values corresponding to SSB #0, SSB #2, and SSB #5 received by the first antenna panel are all higher than the preset strength threshold, the first device can select any one of the three SSBs as the first target SSB of the antenna panel. Alternatively, the three SSBs are further ranked, for example, the ranking result is: SSB #0>SSB #2>SSB #5, and the first device may select SSB #0 as the first target SSB of the first antenna panel. That is to say, when the first antenna panel receives at least one RSRP value higher than the preset strength threshold, the first antenna panel is used to send the random access preamble.

In a possible implementation, the first device may also determine the first target SSB of the first antenna panel as the first target SSB of other antenna panels among the k antenna panels, and random access is initiated on the same random access resource by multiple antenna panels. Alternatively, other antenna panels in the k antenna panels can determine their own first target SSB in the above manner, and the first target SSBs determined by other antenna panels in the k antenna panels can be different from the first target SSB determined by the first antenna panel. For example, SSBs which have a signal strength higher than the preset strength threshold and are received by another antenna panel among the k antenna panels are SSB #1 and SSB #6. In this case, the first device can select SSB #1 as the first target SSB of the antenna panel, or the first device can select SSB #6 as the first target SSB of the antenna panel. When the source device of SSB #1 and SSB #6 is different from the source device of SSB #0, SSB #2, and SSB #5, the first device can initiate random access to different second devices at the same time. In other words, the first device in embodiments of the present disclosure may initiate random access to different second devices simultaneously through multiple antenna panels. According to some embodiments, when the source device of SSB #1 and SSB #6 is the same as the source device of SSB #0, SSB #2, and SSB #5, the first device can initiate random access to the same second device on different random access resources simultaneously.

In a possible implementation, when k=1, the first device may first obtain signal strengths of SSBs which are respectively received by the n antenna panels and sent by the second device, and determine a SSB having the strongest signal strength as a second target SSB. A second antenna panel may be an antenna panel that receives the second target SSB among the n antenna panels. Then, the first device sends the random access preamble corresponding to the second target SSB to the second device on the random access resource corresponding to the second target SSB through the second antenna panel.

For example, SSBs received by one of the n antenna panels from the second device receives are SSB #7, SSB #8 and SSB #9, SSBs received by another antenna panel from the second device are SSB #10 and SSB #11, and the two antenna panels can record the identifiers and corresponding RSRP values of the SSBs received by the two antenna panels, respectively. The first device can obtain the identifiers and corresponding RSRP values of the SSBs recorded by the two antenna panels, and rank the SSBs, and select the SSB corresponding to the highest RSRP value as the second target SSB. For example, among the RSRP values of the five SSBs recorded by the two antenna panels, the SSB corresponding to the highest RSRP value is SSB #9. Under such condition, the first device can use SSB #9 as the second target SSB, and determine the antenna panel which receives the corresponding strength as the second antenna panel. The first device sends the random access preamble corresponding to SSB #9 on the random access resource corresponding to SSB #9 through the second antenna panel. That is, the first device may use one antenna panel corresponding to the synchronization signal block with the strongest RSRP value among SSBs received by the n antenna panels to send the random access preamble. According to some embodiments, when the n antenna panels of the first device respectively receive multiple SSBs from multiple second devices, the first device can select one of the n antenna panels which receives the SSB with the highest RSRP value among the SSBs corresponding to the second devices to send the random access preamble to different second devices.

In a possible implementation, the first device may resend the random access preamble that is sent for the first time by each antenna panel multiple times on the each antenna panel.

For example, the first device can directly perform multiple retransmissions of the random access preamble determined on each antenna panel according to a preset retransmission policy. For example, according to a predetermined retransmission number, multiple retransmissions are performed on multiple continuous or discontinuous time-frequency code resources.

According to some embodiments, a transmission power when the first device uses a third antenna panel to send a random access preamble to the second device for an i-th time is greater than a transmission power when the third antenna panel sends a random access preamble to the second device for an (i−1)-th time, i is an integer greater than or equal to 2. The third antenna panel is any one of the k antenna panels, and a beam direction in which the third antenna panel sends the random access preamble to the second device for the i-th time is the same as a beam direction in which the third antenna panel sends the random access preamble to the second device for the (i−1)-th time.

For example, when the first device sends a random access preamble to the second device for the third time through the third antenna panel, if a beam direction in which the third antenna panel sends the random access preamble to the second device for the third time is the same as a beam direction in which the third antenna panel sends the random access preamble to the second device for the second time, it indicates that for the random access preamble sent to the second device in the beam direction in which the random access preamble is sent for the second time, no response is received from the second device. Under such condition, when the first device sends the random access preamble to the second device for the third time in the same beam direction, the first device may increase the transmission power, so as to increase the probability that the random access preamble can be received by the second device.

According to some embodiments, a transmission power when the first device uses a fourth antenna panel sends a random access preamble to the second device for an i-th time is equal to a transmission power when the fourth antenna panel sends a random access preamble to the second device for an (i−1)-th time, i is an integer greater than or equal to 2. The fourth antenna panel is any one of the k antenna panels, and a beam direction in which the fourth antenna panel sends the random access preamble to the second device for the i-th time is different from a beam direction in which the fourth antenna panel sends the random access preamble to the second device for the (i−1)-th time.

For example, when the first device sends a random access preamble to the second device for the fourth time through the fourth antenna panel, if a beam direction in which the fourth antenna panel sends the random access preamble to the second device for the fourth time is different from a beam direction in which the fourth antenna panel sends the random access preamble to the second device for the third time, it indicates that the first device changes the beam direction for sending the random access preamble this time, and the device sends a corresponding random access preamble according to a new beam direction resource. Under such condition, the first device can send the random access preamble with a transmission power which is the same as the transmission power with which the random access preamble is sent for the third time.

In step 302, the first device monitors at least one Random Access Response (RAR) returned by the second device through the k antenna panels.

The at least one RAR is returned by the second device in response to the at least one random access preamble sent by the k antenna panels.

The random access preambles sent by the first device to the second device can be sent through different antenna panels among the above k antenna panels, that is, the random access preambles sent by the antenna panels may be different. Thus, the first device uses the antenna panels which have sent the random access preambles to monitor the random access responses (RARs) returned by the second device for the random access preambles sent by the antenna panels, respectively.

According to some embodiments, in beam directions in which the k antenna panels receives their respective first target SSBs, the first device uses the k antenna panels to monitor the RARs returned by the second device in response to the random access preambles sent by the k antenna panels, respectively. That is, in the beam direction in which the first target SSB is received, the first antenna panel monitors the RAR sent by the second device in response to the random access preamble sent by the first antenna panel.

For example, the first target SSB determined by the first antenna panel is SSB #11, and the first antenna panel receives the first target SSB in a beam direction 2. Accordingly, after the first antenna panel sends a random access preamble corresponding to the first target SSB, the first antenna panel monitors the RAR sent by the second device in response to the random access preamble corresponding to the first target SSB in the beam direction 2.

In a possible implementation, after a first RAR returned by the second device in response to a random access preamble sent by a fifth antenna panel is successfully received by the first device through the fifth antenna panel for the first time, the first device stops the step of sending the at least one random access preamble to the second device and the step of monitoring the at least one RAR through the k antenna panels among the n antenna panels. The fifth antenna panel is an antenna panel among the k antenna panels which first successfully receives the RAR returned by the second device. The first RAR is the RAR which is first received by the first device and is sent from the second device.

According to some embodiments, after the first device sends, by the k antenna panels, the random access preambles corresponding to respective first target SSBs determined by the k antenna panels in the above step 301, the antenna panels among the k antenna panels which have sent the random access preambles can monitor RARs sent by the second device for the random access preambles sent by the antenna panels, respectively. If the random access preambles need to be repeatedly sent multiple times in each of the k antenna panels, when any one of the antenna panels (that is, the fifth antenna panel) successfully receives its own RAR for the first time, the remaining antenna panels may be sending their own random access preambles. Under such condition, the first device can make the remaining antenna panels that are sending the random access preambles stop the sending of random access preambles. And, when any one of the antenna panels (that is, the fifth antenna panel) successfully receives its own RAR for the first time, there may be antenna panels that are monitoring their own RARs among the remaining antenna panels in the first device. Under such condition, the first device may make the antenna panels that are monitoring their own RARs stop the monitoring of RARs.

For example, when k=2, the first device sends through the two antenna panels random access preambles corresponding to their first target SSBs respectively determined by the two antenna panels. One antenna panel of the two antenna panels receives the RAR returned by the second device for the one antenna panel earlier than when the other antenna panel of the two antenna panels receives the RAR returned by the second device for the other one antenna panel. In this case, if the antenna panel that has not yet received its RAR is monitoring the RAR returned by the second device for the antenna panel, the first terminal can make the antenna panel that has not yet received its RAR stop the monitoring. Alternatively, if the antenna panel that has not yet received its RAR is sending the random access preamble corresponding its determined first target SSB, the first terminal can make the antenna panel that is sending the random access preamble stop the sending.

In step 303, the first terminal sends a random access contention resolution message to the second device through at least one antenna panel among the k antenna panels.

For a non-contention based random access procedure, after the first device receives the RAR returned by the second device, the first device can declare that the first device has succeeded in random access. In a contention based random access procedure, the first device further needs to send a corresponding contention resolution message MSG3 to the second device to complete subsequent random access.

In a possible implementation, when the first device selects a single fifth antenna panel among the k antenna panels to send the random access preamble, the first device can receive, through the fifth antenna panel, the random access response returned by the second device in response to the random access preamble sent this time, and the first device can use the fifth antenna panel to send the contention resolution message MSG3.

According to some embodiments, the first device sends the random access contention resolution message corresponding to the received first RAR to the second device through the k antenna panels simultaneously. That is, when the first device receives through the k antenna panels the RAR returned by the second device for one of the k antenna panels, the first device can send the contention resolution message MSG3 through the antenna panel which receives the RAR. According to some other embodiments, the first device may send the random access contention resolution message MSG3 through the fifth antenna panel and through antenna panels other than the fifth antenna panel among the k antenna panels. In addition, the other antenna panels send the random access contention resolution message MSG3 to the second device in the beam directions in which the other antenna panels send their random access preambles.

According to some embodiments, no matter whether the first device uses a single antenna panel to send the contention resolution message MSG3, or uses more than one antenna panel among the k antenna panels to send the contention resolution message MSG3, the beam direction in which the first device uses the fifth antenna panel to send the contention resolution message MSG3 may be determined by a beam direction indicated in the first RAR.

In a possible implementation, if the first RAR does not contain beam indication information for indicating the first device to send the contention resolution message MSG3, the first device may send the contention resolution message MSG3 to the second device in the beam directions in which the k antenna panels send their respective random access preambles.

For example, the antenna panel through which the first device receives the first RAR is antenna panel 1, and the beam direction of the antenna panel 1 corresponding to the first target SSB is beam direction A. That is, the antenna panel 1 sends the random access preamble in the beam direction A, and the antenna panel 1 is an antenna panel among the k antenna panels which first receives the RAR returned by the second device. In this case, the first RAR is the RAR received by the antenna panel 1. If the first RAR does not contain the beam indication information, when the first device sends the contention resolution message MSG3, the first device can either send the contention resolution message MSG3 in the beam direction A through the antenna panel 1 alone, or send the contention resolution message MSG3 through at least one other antenna panel among the k antenna panels in the beam directions in which the at least one other antenna panel among the k antenna panels sends its random access preamble while sending the contention resolution message MSG3 in the beam direction A through the antenna panel 1.

In summary, in embodiments of the present disclosure, the first device sends respective random access preambles to the second device through k antenna panels among the n antenna panels, so that the first device can initiate random access based on its own different antenna panels. Thus, the chance of sending the random access preambles is increased when the first device initiates random access, the efficiency of random access is improved, and the application scenario for the first device to initiate random access is expanded.

In some embodiments of the present disclosure, a certain limit may be imposed on the working power of the k antenna panels working at the same time in the first device. The limitation can be as follows: the number of antenna panels which are in a transmission state at the same time among the k antenna panels is L, and a maximum transmission power of each of the L antenna panels is 1/L of a maximum transmission power of the first device, L is a positive integer less than or equal to k; or, a sum of transmission powers of the L antenna panels is less than or equal to the maximum transmission power of the first device.

For example, when the rated power of the first device is W, and the number of antenna panels when the first device sends the random access preambles to the second device at the same time is e, the maximum transmission power of each of the e antenna panels cannot be greater than 1/e of W; or, the sum of transmission powers of the e antenna panels in the first device cannot be greater than W. According to some embodiments, for other cases where the first device transmits data through multiple antenna panels and the second device transmits data through multiple antenna panels, the power limitation condition is also applicable.

In a possible implementation, the spectrum resource where the random access is initiated between the first device and the second device may be in an unlicensed spectrum, for example, Wireless Fidelity (Wi-Fi), Bluetooth (BT) and other communication technologies are transmitted through unlicensed spectrum. The unlicensed spectrum can also be used for access in LTE and NR. Generally, in the unlicensed spectrum, when data is transmitted between various devices, it is usually necessary to perform Listen Before Talk (LBT) for channel detection, and only when the corresponding transmission channel is in an idle state, data transmission can be started.

For example, in the aforementioned random access procedure, the frequency domain resource for the random access may be in the unlicensed spectrum. When the first device sends the random access preambles or contention resolution message MSG3 to the second device, and when the second device sends SSBs or RARs to the first device, the first device or the second device can perform LBT detection through their respective antenna panels. When the channel detection results of the corresponding antenna panels are in an idle state, the data transmission step can be started.

In embodiments of the present disclosure, the k antenna panels of the first device may separately perform channel detection on the broadband where the random access frequency domain resource is located in an LBT manner. For example, when the first device uses at least two antenna panels among the k antenna panels to initiate random access, the at least two antenna panels can respectively detect whether the channel resources to be detected are idle. According to some embodiments, when the channel resource detected by each antenna panel is idle, the corresponding antenna panel can send its own random access preamble. For example, when k=4, two of the four antenna panels detect that their channel resources are idle, the two antenna panels can send their respective random access preambles first, and the other two antenna panels need to send their random access preambles only when they detect that their channel resources are idle. Similarly, when the first device uses multiple antenna panels to send the contention resolution message MSG3, the first device can also first detect whether the channel resource is idle using the LBT method, and only when the channel resource is idle, the first device can send the contention resolution message MSG3. Similarly, the second device can send SSBs to the first device before random access, or send RARs to the first device during the random access procedure using the LBT method, and for the details of the LBT detection, reference can be made to the above descriptions about the examples where first device sends the random access preambles, and repeated descriptions are omitted here.

According to some embodiments of the present disclosure, the multiple antenna panels may perform LBT detection in different manners. For example, r antenna panels among the k antenna panels perform detections using a channel detection mechanism of LBT cat.2, and (k-r) antenna panels perform detections using a channel detection mechanism of LBT cat.4. Further, the different channel detection mechanisms used by the first device may be notified to the first device in indication signaling (for example: paging information or DCI signaling, etc.) from the second device, and the first device uses the channel detection mechanism notified by the second device to perform LBT detection. Alternatively, the different channel detection mechanisms used by the first device may be determined by a device chip in the first device. For example, the device chip in the first device stores several channel detection mechanisms, and when the terminal needs to perform channel detection, the terminal can select a corresponding channel detection mechanism for channel detection.

The channel detection mechanism LBT cat.2 is a detection mechanism for one time unit, that is, only one time unit granularity needs to be detected, such as detecting whether a channel is idle at a time granularity of 25 us (the Received Signal Strength Indication (RSSI) value on the channel is detected, and the RSSI value is compared with a preset threshold value; if the RSSI value on the channel is less than the preset threshold value, the detection result is idle; otherwise, the detection result is not idle). Accordingly, when the detection result is that the channel is in an idle state, related data can be sent; otherwise, continue detection on the channel is performed.

The principle of the channel detection mechanism LBT cat.4 can be as follows. Firstly, whether a channel is idle is detected in a first time granularity, and the RSSI on the channel is compared with a preset threshold value; if the RSSI value on the channel is less than the preset threshold value, the detection result is idle; otherwise, the detection result is not idle. Further, if the detection result is that the channel is idle, the value of Contention Window Size (CWS) is determined. A random number S is taken between 0 and the CWS value. Then, whether the channel is idle is detected at a second time granularity, if the channel is idle, the random number S is reduced by 1; otherwise, whether the channel is idle is detected at the first time granularity. If the channel is idle, the random number S is reduced by 1, and the time granularity is changed to the second time granularity to detect whether the channel is idle, and so on, until the random number S is reduced to 0, which means that the channel is idle, and the device can start to occupy the channel to transmit data on the corresponding channel (as shown by the parameter T in Table 2, T represents the length of time that can be occupied when the random access preamble is sent when the detection result is idle).

According to some embodiments, the first time granularity may be 16 us+M*9 us (the value of M may be determined by the channel access priority class h in Table 2 below, and different values of M correspond to different priorities), and the second time granularity can be 9 us. It can be seen from Table 2 that the CWS value determines the range of the random number S, and for different channel access priority classes, there are different parameters as shown in Table 2 below. For different channel access priority classes, optional values for CWS may be different. When accessing the channel for the first time, the minimum value of CWS is selected; and when the channel is detected to be idle for the first time and after the maximum channel occupancy time is over, the value of the CWS when channel detection is performed for the second time needs to be determined according to the reception error rate of the data transmission in one of the subframes (a reference frame) within the first channel occupancy time. For example, if the proportion of NACKs for all data sent by a base station in the reference subframe reaches 80% or more, the CWS value needs to be increased; otherwise, the CWS value remains unchanged. When the CWS value is increased to the maximum and the maximum detection number is reached, the CWS value is reset to the minimum value of CWS.

TABLE 2

| channel access priority class (h) | M | $CWS_{min}$ | $CWS_{max}$ | T | CWS range |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 ms or 10 ms | {15, 31, 631} |
| 4 | 7 | 15 | 1023 | 8 ms or 10 ms | {15, 31, 63, 127, 255, 511, 1023} |

In a possible implementation, when the random access frequency domain resource is a frequency domain resource shared by multiple first devices, that is, the first device is a terminal (such as a vehicle-mounted device) in the wireless communication system, in this case, the frequency domain resource may be a frequency domain resource shared by multiple first devices in the Sidelink. Correspondingly, the first device and the second device also need to perform channel detection using LBT before data transmission. When the result of channel detection is idle, data can be transmitted to the other party. Similarly, for the method of adopting LBT and the method of adopting multiple antenna panels for LBT detection, reference can be made to the description regarding the above unlicensed spectrum, and details are omitted here.

The following are device embodiments of the present disclosure, which can be used to implement the method embodiments of the present disclosure. For details that are not disclosed in the device embodiments of the present disclosure, please refer to the method embodiments of the present disclosure.

Figure 4:
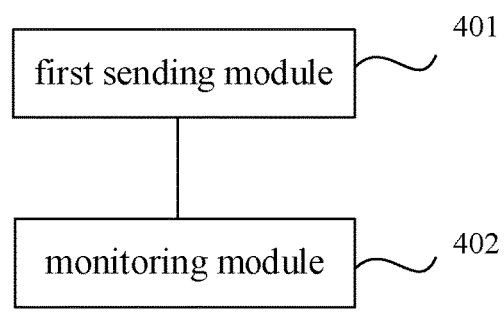
FIG. 4 is a block diagram of a random access device according to an exemplary embodiment.

FIG. 4 is a block diagram showing a random access device according to an exemplary embodiment. As shown in FIG. 4, the random access device may be implemented as all or part of the terminal in the implementation environment shown in FIG. 1 through hardware or a combination of software and hardware, so as to perform the steps which are performed by the first device in any one of the embodiment shown in FIG. 2 or FIG. 3. The random access device may include a first sending module 401 and a monitoring module 402.

The first sending module 401 is configured to send, by k antenna panels among the n antenna panels, at least one random access preamble individually to a second device, 1≤k≤n, and k being an integer.

The monitoring module 402 is configured to monitor, by the k antenna panels, at least one Random Access Response (RAR) returned by the second device, wherein the at least one RAR is returned by the second device in response to the at least one random access preamble sent by the k antenna panels.

According to some embodiments, the first sending module 401 includes a first determination submodule and a first sending module:
  wherein the first determination submodule is configured to, when k is greater than 1, determine a first target synchronization signal block from synchronization signal blocks which are received by a first antenna panel and sent by the second device, wherein the first antenna panel is any one of the k antenna panels; and
  wherein the first sending submodule is configured to send, by the first antenna panel, a random access preamble corresponding to the first target synchronization signal block to the second device on a random access resource corresponding to the first target synchronization signal block.

According to some embodiments, the first determination submodule includes a first obtaining unit and a first determination unit:
  wherein the first obtaining unit is configured to obtain signal strengths corresponding to the synchronization signal blocks which are received by the first antenna panel and sent by the second device; and
  wherein the first determination unit is configured to, when there is at least one synchronization signal block whose corresponding signal strength is higher than a preset strength threshold, determine one of the at least one synchronization signal block whose corresponding signal strength is higher than the preset strength threshold as the first target synchronization signal block.

According to some embodiments, the monitoring module 402 is configured to:
  in a beam direction in which the first target synchronization signal block is received, monitor, by the first antenna panel, a RAR returned by the second device in response to the random access preamble sent by the first antenna panel.

According to some embodiments, the first sending module further includes a first obtaining submodule, a second determination submodule, a third determination submodule and a second sending submodule;
  the first obtaining submodule is configured to, when k is equal to 1, obtain signal strengths corresponding to synchronization signal blocks which are received individually by the n antenna panels and sent by the second device;
  the second determination submodule is configured to determine a synchronization signal block corresponding to a strongest signal strength as a second target synchronization signal block;
  the third determination submodule is configured to determine an antenna panel through which the second target synchronization signal block is received as a second antenna panel; and
  the second sending submodule is configured to send, by the second antenna panel, a random access preamble corresponding to the second target synchronization signal block to the second device on a random access resource corresponding to the second target synchronization signal block.

According to some embodiments, the first sending module 401 is further configured to:
  a transmission power when a third antenna panel sends a random access preamble to the second device for an i-th time being greater than a transmission power when the third antenna panel sends a random access preamble to the second device for an (i–1)-th time, wherein i is an integer greater than or equal to 2;
  wherein the third antenna panel is any one of the k antenna panels, and a beam direction in which the third antenna panel sends the random access preamble to the second device for the i-th time is the same as a beam direction in which the third antenna panel sends the random access preamble to the second device for the (i–1)-th time.

According to some embodiments, the first sending module is further configured to:
  a transmission power when a fourth antenna panel sends a random access preamble to the second device for an i-th time being equal to a transmission power when the fourth antenna panel sends a random access preamble to the second device for an (i–1)-th time, wherein i is an integer greater than or equal to 2;
  wherein the fourth antenna panel is any one of the k antenna panels, and a beam direction in which the fourth antenna panel sends the random access preamble to the second device for the i-th time is different from a beam direction in which the fourth antenna panel sends the random access preamble to the second device for the (i–1)-th time.

According to some embodiments, there are L antenna panels which are in a transmission state at the same time among the k antenna panels, and a maximum transmission power of each of the L antenna panels is 1/L of a maximum transmission power of the first device, L is a positive integer less than or equal to k; or,
  a sum of transmission powers of the L antenna panels is less than or equal to the maximum transmission power of the first device.

According to some embodiments, the monitoring module 402 is further configured to:

after a first RAR returned by the second device in response to a random access preamble sent by a fifth antenna panel is successfully received for a first time by the fifth antenna panel, stop the sending of the at least one random access preamble to the second device and the monitoring of the at least one RAR by the k antenna panels;

wherein the fifth antenna panel is an antenna panel among the k antenna panels which first successfully receives the RAR returned by the second device.

According to some embodiments, the device further includes:

a second sending module configured to send a random access contention resolution message to the second device by at least one antenna panel among the k antenna panels.

According to some embodiments, the second sending module includes a third sending submodule:

wherein the third sending submodule is configured to, in a beam direction indicated by the first RAR or in a beam direction in which the fifth antenna panel sends the random access preamble, send, by the fifth antenna panel, the random access contention resolution message corresponding to the first RAR to the second device.

According to some embodiments, the second sending module includes a fourth sending submodule:

wherein the fourth sending submodule is configured to send, by at least one other antenna panel among the k antenna panels in addition to the fifth antenna panel, a random access contention resolution message to the second device in a beam direction in which the at least one other antenna panel individually sends a random access preamble.

According to some embodiments, the device further includes:

a first detection module configured to, before the first sending module 401 sends, by k antenna panels among the n antenna panels, the at least one random access preamble to the second device, perform, by the k antenna panels among the n antenna panels, channel detection on a bandwidth where a random access frequency domain resource is located in a listen-before-talk manner, when the bandwidth where the random access frequency domain resource is located is an unlicensed spectrum;

wherein the first sending module 401 is configured to:

when a channel detection result of each of the k antenna panels is an idle state, perform the step of sending the at least one random access preamble individually to the second device by k antenna panels among the n antenna panels.

According to some embodiments, the device further includes:

a second detection module configured to, before the first sending module 401 sends, by k antenna panels among the n antenna panels, the at least one random access preamble to the second device, perform by the k antenna panels among the n antenna panels, channel detection on a random access frequency domain resource in a listen-before-talk manner, when the random access frequency domain resource is a frequency domain resource shared by a plurality of first devices;

wherein the first sending module 401 is configured to:

when a channel detection result of each of the k antenna panels is an idle state, perform the step of sending the at least one random access preamble individually to the second device by k antenna panels among the n antenna panels.

An embodiment of the present disclosure provides a random access device which can be used to implement all or part of the steps which are performed by the first device in any one of the embodiment shown in FIG. 2 or FIG. 3. The random access device includes a processor, and a memory for storing instructions executable by the processor.

The processor is configured to:

send, by k antenna panels among the n antenna panels, at least one random access preamble individually to a second device, $1 \leq k \leq n$, and k being an integer; and monitor, by the k antenna panels, at least one Random Access Response (RAR) returned by the second device, wherein the at least one RAR is returned by the second device in response to the at least one random access preamble sent by the k antenna panels.

According to some embodiments, sending, by k antenna panels among the n antenna panels, the at least one random access preamble individually to the second device may be implemented as follows. The processor is configured to:

when k is greater than 1, determine a first target synchronization signal block from synchronization signal blocks which are received by a first antenna panel and sent by the second device, wherein the first antenna panel is any one of the k antenna panels; and send, by the first antenna panel, a random access preamble corresponding to the first target synchronization signal block to the second device on a random access resource corresponding to the first target synchronization signal block.

According to some embodiments, determining the first target synchronization signal block from synchronization signal blocks which are received by the first antenna panel and sent by the second device may be implemented as follows. The processor is configured to:

obtain signal strengths corresponding to the synchronization signal blocks which are received by the first antenna panel and sent by the second device; and when there is at least one synchronization signal block whose corresponding signal strength is higher than a preset strength threshold, determine one of the at least one synchronization signal block whose corresponding signal strength is higher than the preset strength threshold as the first target synchronization signal block.

According to some embodiments, monitoring, by the k antenna panels, the at least one RAR returned by the second device may be implemented as follows. The processor is configured to:

in a beam direction in which the first target synchronization signal block is received, monitor, by the first antenna panel, a RAR returned by the second device in response to the random access preamble sent by the first antenna panel.

According to some embodiments, when k is equal to 1, sending, by the k antenna panels among the n antenna panels, the at least one random access preamble individually to the second device may be implemented as follows. The processor is configured to:

obtain signal strengths corresponding to synchronization signal blocks which are received individually by the n antenna panels and sent by the second device;

determine a synchronization signal block corresponding to a strongest signal strength as a second target synchronization signal block;

t determine an antenna panel through which the second target synchronization signal block is received as a second antenna panel; and send, by the second antenna panel, a random access preamble corresponding to the second target synchronization signal block to the second device on a random access resource corresponding to the second target synchronization signal block.

According to some embodiments, sending, by the k antenna panels among the n antenna panels, the at least one random access preamble individually to the second device may be implemented as follows. The processor is configured to:

a transmission power when a third antenna panel sends a random access preamble to the second device for an i-th time being greater than a transmission power when the third antenna panel sends a random access preamble to the second device for an (i–1)-th time, wherein i is an integer greater than or equal to 2;

wherein the third antenna panel is any one of the k antenna panels, and a beam direction in which the third antenna panel sends the random access preamble to the second device for the i-th time is the same as a beam direction in which the third antenna panel sends the random access preamble to the second device for the (i–1)-th time.

According to some embodiments, sending, by the k antenna panels among the n antenna panels, the at least one random access preamble individually to the second device may be implemented as follows. The processor is configured to:

a transmission power when a fourth antenna panel sends a random access preamble to the second device for an i-th time being equal to a transmission power when the fourth antenna panel sends a random access preamble to the second device for an (i–1)-th time, wherein i is an integer greater than or equal to 2;

wherein the fourth antenna panel is any one of the k antenna panels, and a beam direction in which the fourth antenna panel sends the random access preamble to the second device for the i-th time is different from a beam direction in which the fourth antenna panel sends the random access preamble to the second device for the (i–1)-th time.

According to some embodiments, there are L antenna panels which are in a transmission state at the same time among the k antenna panels, and a maximum transmission power of each of the L antenna panels is 1/L of a maximum transmission power of the first device, L is a positive integer less than or equal to k; or, a sum of transmission powers of the L antenna panels is less than or equal to the maximum transmission power of the first device.

According to some embodiments, monitoring, by the k antenna panels, the at least one RAR returned by the second device may be implemented as follows. The processor is configured to:

after a first RAR returned by the second device in response to a random access preamble sent by a fifth antenna panel is successfully received for a first time by the fifth antenna panel, stop the sending of the at least one random access preamble to the second device and the monitoring of the at least one RAR by the k antenna panels;

wherein the fifth antenna panel is an antenna panel among the k antenna panels which first successfully receives the RAR returned by the second device.

According to some embodiments, the processor is further configured to:

send a random access contention resolution message to the second device by at least one antenna panel among the k antenna panels.

According to some embodiments, sending the random access contention resolution message to the second device by the at least one antenna panel among the k antenna panels may be implemented as follows. The processor is configured to:

in a beam direction indicated by the first RAR or in a beam direction in which the fifth antenna panel sends the random access preamble, send, by the fifth antenna panel, the random access contention resolution message corresponding to the first RAR to the second device.

According to some embodiments, sending the random access contention resolution message to the second device by the at least one antenna panel among the k antenna panels may be implemented as follows. The processor is configured to:

send, by at least one other antenna panel among the k antenna panels in addition to the fifth antenna panel, a random access contention resolution message to the second device in a beam direction in which the at least one other antenna panel individually sends a random access preamble.

According to some embodiments, the processor is further configured to:

before the first sending module sends, by k antenna panels among the n antenna panels, the at least one random access preamble to the second device, perform, by the k antenna panels among the n antenna panels, channel detection on a bandwidth where a random access frequency domain resource is located in a listen-before-talk manner, when the bandwidth where the random access frequency domain resource is located is an unlicensed spectrum;

sending, by k antenna panels among the n antenna panels, the at least one random access preamble individually to the second device includes:

when a channel detection result of each of the k antenna panels is an idle state, performing the step of sending the at least one random access preamble individually to the second device by k antenna panels among the n antenna panels.

According to some embodiments, the processor is further configured to:

before the at least one random access preamble is sent to the second device by k antenna panels among the n antenna panels, to the second device, perform by the k antenna panels among the n antenna panels, channel detection on a random access frequency domain resource in a listen-before-talk manner, when the random access frequency domain resource is a frequency domain resource shared by a plurality of first devices;

sending, by k antenna panels among the n antenna panels, the at least one random access preamble individually to the second device includes:

when a channel detection result of each of the k antenna panels is an idle state, performing the step of sending the at least one random access preamble individually to the second device by k antenna panels among the n antenna panels.

It should be noted that, when the devices provided in the above embodiments realize their functions, the division of the above-mentioned functional modules is used as an example for illustration. In actual applications, the above-mentioned functions can be allocated to different functional modules according to actual needs. That is, the content structure of the device is divided into different functional modules to complete all or part of the functions described above.

Regarding the devices in the foregoing embodiments, the specific manner in which each module performs operations has been described in detail in the embodiments of the methods, and detailed description will not be given here.

The foregoing mainly introduces the solutions provided by the embodiments of the present disclosure from the perspective of the interaction between the first device and the second device. It can be understood that, in order to realize the above-mentioned functions, the first device and the second device include hardware structures and/or software modules corresponding to the functions. In combination with the units and algorithm and steps of the examples described in the embodiments of the present disclosure, the embodiments of the present disclosure can be implemented in the form of hardware or a combination of hardware and computer software. Whether a certain function is implemented by hardware or hardware computer driven by software depends on the specific application and design constraints of the technical solutions. Those skilled in the art can use different methods for each specific application to implement the described functions, but such implementations should not be considered as going beyond the scope of the technical solutions of the embodiments of the present disclosure.

Figure 5:
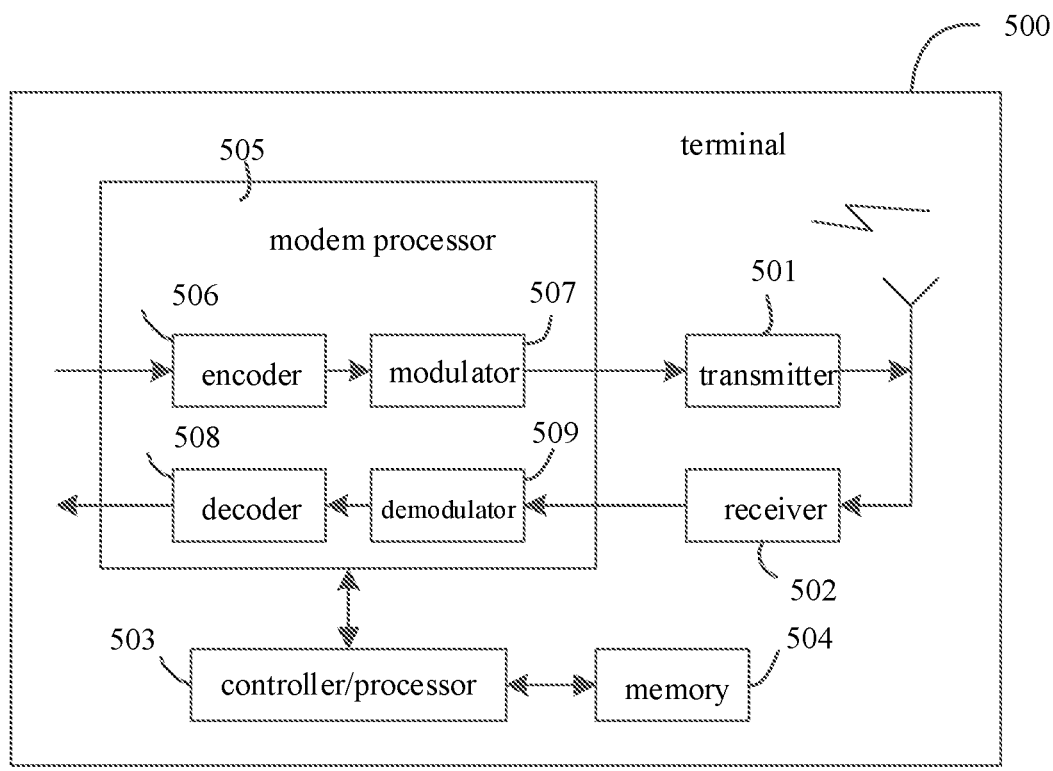
FIG. 5 is a schematic structural diagram of a terminal according to an exemplary embodiment.

FIG. 5 is a schematic structural diagram of a terminal according to an exemplary embodiment.

The terminal 500 includes a transmitter 501, a receiver 502, and a processor 503. The processor 503 may also be a controller, which is represented as "controller/processor 503" in FIG. 5. According to some embodiments, the terminal 500 may further include a modem processor 505, and the modem processor 505 may include an encoder 506, a modulator 507, a decoder 508, and a demodulator 509.

In one example, the transmitter 501 adjusts (for example, performs analog conversion, filters, performs amplification, and performs up-conversion, etc.) output samples and generates an uplink signal, which is transmitted to the base station described in the above embodiments via an antenna. On the downlink, the antenna receives a downlink signal transmitted by the base station in the above embodiments. The receiver 502 adjusts (for example, filters, performs amplification, performs down-conversion, performs digitization, etc.) the signal received from the antenna and provides input samples. In the modem processor 505, the encoder 506 receives service data and signaling messages to be transmitted on the uplink, and processes the service data and signaling messages (for example, performs formatting, encoding, and interleaving). The modulator 507 further processes (for example, performs symbol mapping and modulation) the encoded service data and signaling messages and provides output samples. The demodulator 509 processes (e.g., demodulates) the input samples and provides symbol estimates. The decoder 508 processes (e.g., deinterleaves and decodes) the symbol estimates and provides decoded data and signaling messages to the terminal 500. The encoder 506, the modulator 507, the demodulator 509, and the decoder 508 can be implemented by a synthesized modem processor 505. These units are processed according to the radio access technology adopted by the radio access network (for example, the access technology used by LTE and other evolved systems). It should be noted that when the terminal 500 does not include the modem processor 505, the foregoing functions of the modem processor 505 may also be implemented by the processor 503.

The processor 503 controls and manages actions of the terminal 500, and is used to execute the processing procedure performed by the terminal 500 in the foregoing embodiments of the present disclosure. For example, the processor 503 is further configured to execute each step on the terminal side in the foregoing method embodiments, and/or other steps of the technical solutions described in the embodiments of the present disclosure.

Further, the terminal 500 may further include a memory 504, and the memory 504 is configured to store program codes and data for the terminal 500.

It is understandable that FIG. 5 only shows a simplified design of the terminal 500. In practical applications, the terminal 500 may include any number of transmitters, receivers, processors, modem processors, memories, etc., and all terminals that can implement the embodiments of the present disclosure are within the protection scope of embodiments of the present disclosure.

Figure 6:
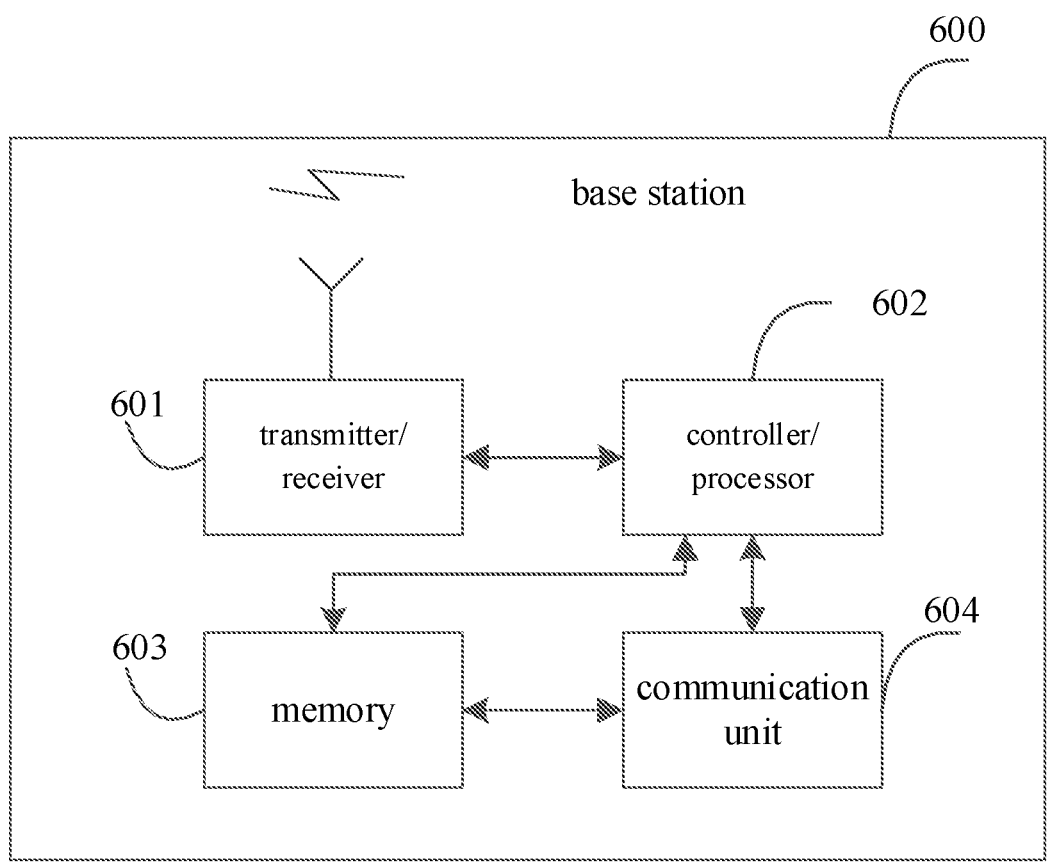
FIG. 6 is a schematic structural diagram of a base station according to an exemplary embodiment.

FIG. 6 is a schematic structural diagram showing a base station according to an exemplary embodiment.

The base station 600 includes a transmitter/receiver 601 and a processor 602. The processor 602 may also be a controller, which is represented as "controller/processor 602" in FIG. 6. The transmitter/receiver 601 is used to support the sending and receiving of information between the base station and the terminal in the foregoing embodiments, and to support communications between the base station and other network entities. The processor 602 performs various functions for communicating with the terminal. In the uplink, the uplink signal from the terminal is received via the antenna, demodulated by the receiver 601 (for example, demodulating the high-frequency signal into a baseband signal), and further processed by the processor 602 to restore the service data and signaling messages sent from the terminal to the base station. In the downlink, service data and signaling messages are processed by the processor 602, and modulated by the transmitter 601 (for example, the baseband signal is modulated into a high-frequency signal) to generate a downlink signal, which is transmitted to the terminal via the antenna. It should be noted that the above-mentioned demodulation or modulation function may also be completed by the processor 602. For example, the processor 602 is further configured to execute each step on the base station side in the foregoing method embodiments, and/or other steps of the technical solutions described in the embodiments of the present disclosure.

Further, the base station 600 may further include a memory 603, and the memory 603 is used to store program codes and data for the base station 600. In addition, the base station 600 may further include a communication unit 604. The communication unit 604 is configured to support the base station 600 to communicate with other network entities (for example, network devices in a core network, etc.). For example, in the 5G NR system, the communication unit 604 may be an NG-U interface for supporting the base station 600 to communicate with a UPF (User Plane Function) entity; or, the communication unit 604 may be an NG-C interface for supporting the base station 600 to communicate with an AMF (Access and Mobility Management Function) entities.

It can be understood that FIG. 6 only shows a simplified design of the base station 600. In practical applications, the base station 600 may include any number of transmitters, receivers, processors, controllers, memories, communication units, etc., and all base stations that can implement the embodiments of the present disclosure are within the protection scope of the embodiments of the present disclosure.

Those skilled in the art should be aware that, in one or more of the foregoing examples, the functions described in the embodiments of the present disclosure may be implemented by hardware, software, firmware, or any combination thereof. When implemented by software, these functions can be stored in a computer-readable medium or transmitted as one or more instructions or codes on the computer-readable medium. The computer-readable medium includes a computer storage medium and a communication medium. The communication medium includes any medium that facilitates the transfer of a computer program from one place to another. The storage medium may be any available medium that can be accessed by a general-purpose or special-purpose computer.

An embodiment of the present disclosure also provides a computer storage medium for storing computer software instructions used for the above-mentioned first device. The computer software instructions include a program designed for executing the above-mentioned random access methods.

It should be understood that the "plurality" mentioned herein refers to two or more. The expression "and/or" describes an association relationship of associated objects, indicating that there can be three types of relationships, for example, A and/or B can mean: A alone, B alone, and A and B together. The character "/" generally indicates that the associated objects before and after "/" are in an "or" relationship.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A random access method, the method being performed by a first device comprising n antenna panels, n being an integer greater than or equal to 2, and the method comprising:
   sending, by k antenna panels among the n antenna panels, at least one random access preamble individually to a second device, $1 \leq k \leq n$, and k being an integer; and
   monitoring, by the k antenna panels, at least one Random Access Response (RAR) returned by the second device, wherein the at least one RAR is returned by the second device in response to the at least one random access preamble sent by the k antenna panels;
   wherein when the k is greater than 1, sending, by k antenna panels among the n antenna panels, the at least one random access preamble individually to the second device comprises:
      determining a first target synchronization signal block from synchronization signal blocks which are received by a first antenna panel and sent by the second device, wherein the first antenna panel is any one of the k antenna panels; and
   sending, by the first antenna panel, a random access preamble corresponding to the first target synchronization signal block to the second device on a random access resource corresponding to the first target synchronization signal block;
   wherein said monitoring, by the k antenna panels, the at least one RAR returned by the second device comprises:
      in a beam direction in which the first target synchronization signal block is received, monitoring, by the first antenna panel, a RAR returned by the second device in response to the random access preamble sent by the first antenna panel.

2. The method according to claim 1, wherein said determining the first target synchronization signal block from synchronization signal blocks which are received by the first antenna panel and sent by the second device comprises:
   obtaining signal strengths corresponding to the synchronization signal blocks which are received by the first antenna panel and sent by the second device; and
   when there is at least one synchronization signal block whose corresponding signal strength is higher than a preset strength threshold, determining one of the at least one synchronization signal block whose corresponding signal strength is higher than the preset strength threshold as the first target synchronization signal block.

3. A random access device, the device being applied in a first device which comprises n antenna panels, n being an integer greater than or equal to 2, and the device comprising:
   a processor; and
   a memory storing instructions executable by the processor;
   wherein the processor is configured to:
   send, by k antenna panels among the n antenna panels, at least one random access preamble individually to a second device, $1 \leq k \leq n$, and k being an integer; and
   monitor, by the k antenna panels, at least one Random Access Response (RAR) returned by the second device, wherein the at least one RAR is returned by the second device in response to the at least one random access preamble sent by the k antenna panels;
   when the k is greater than 1, determine a first target synchronization signal block from synchronization signal blocks which are received by a first antenna panel and sent by the second device, wherein the first antenna panel is any one of the k antenna panels; and
   send, by the first antenna panel, a random access preamble corresponding to the first target synchronization signal block to the second device on a random access resource corresponding to the first target synchronization signal block;
   in a beam direction in which the first target synchronization signal block is received, monitor, by the first antenna panel, a RAR returned by the second device in response to the random access preamble sent by the first antenna panel.

4. The device according to claim 3, wherein the processor is further configured to:
   obtain signal strengths corresponding to the synchronization signal blocks which are received by the first antenna panel and sent by the second device; and
   when there is at least one synchronization signal block whose corresponding signal strength is higher than a preset strength threshold, determine one of the at least one synchronization signal block whose corresponding signal strength is higher than the preset strength threshold as the first target synchronization signal block.

* * * * *